United States Patent
Friedrich et al.

(10) Patent No.: US 9,407,678 B2
(45) Date of Patent: Aug. 2, 2016

(54) SYSTEM AND METHOD FOR LOCATING A BOUNDARY POINT WITHIN ADAPTIVE BITRATE CONDITIONED CONTENT

(71) Applicant: CISCO TECHNOLOGY, INC., San Jose, CA (US)

(72) Inventors: Eric Colin Friedrich, Somerville, MA (US); Carol Etta Iturralde, Framingtonham, MA (US); Scott C. Labrozzi, Cary, NC (US); Anne K. McCormick, Boxborough, MA (US); Matthew Francis Caulfield, Clinton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 362 days.

(21) Appl. No.: 14/059,322

(22) Filed: Oct. 21, 2013

(65) Prior Publication Data

US 2015/0113173 A1 Apr. 23, 2015

(51) Int. Cl.
*G06K 9/36* (2006.01)
*G06K 9/46* (2006.01)
*H04L 29/06* (2006.01)
*G06F 15/173* (2006.01)

(52) U.S. Cl.
CPC ........ *H04L 65/602* (2013.01); *G06F 15/17325* (2013.01); *H04L 65/80* (2013.01); *H04L 65/4069* (2013.01)

(58) Field of Classification Search
None
See application file for complete search history.

(56) References Cited

U.S. PATENT DOCUMENTS

| | | | |
|---|---|---|---|
| 8,532,171 B1* | 9/2013 | Narayanan | H04N 21/8451 375/240.01 |
| 8,798,402 B2* | 8/2014 | Hill | G06K 9/00751 382/173 |
| 2007/0030396 A1* | 2/2007 | Zhou | G06F 17/30802 348/700 |
| 2007/0031062 A1* | 2/2007 | Pal | G06F 17/30843 382/284 |
| 2010/0188580 A1* | 7/2010 | Paschalakis | G06F 17/30802 348/571 |
| 2011/0311135 A1* | 12/2011 | Chupeau | G06K 9/00711 382/165 |
| 2012/0163475 A1* | 6/2012 | Na | G06F 17/30784 375/240.25 |
| 2012/0177296 A1* | 7/2012 | Ren | G06F 17/30799 382/218 |
| 2013/0322513 A1* | 12/2013 | Law | H04N 7/14 375/240.01 |
| 2014/0037140 A1* | 2/2014 | Benhimane | G06K 9/6211 382/103 |
| 2014/0185667 A1* | 7/2014 | McPhillen | H04N 19/00472 375/240.03 |

OTHER PUBLICATIONS

Yandan Wang, Mohammed Belkhatir, Bashar Tahayna, Near-duplicate video retrieval based on clustering by multiple sequence alignment, Proceedings of the 20th ACM international conference on Multimedia, Oct. 29-Nov. 2, 2012, Nara, Japan.*

(Continued)

*Primary Examiner* — Andrae S Allison
(74) *Attorney, Agent, or Firm* — Patent Capital Group

(57) ABSTRACT

A method is provided in one example and includes determining an occurrence of an exception to a predetermined cadence associated with an input stream of a profile, determining a shifted cadence based, at least in part, on the exception, receiving an indication of a key frame in the profile, determining that the key frame aligns with the shifted cadence, designating the key frame as a boundary point based, at least in part, on the shifted cadence, and communicating the boundary point.

17 Claims, 7 Drawing Sheets

(56) References Cited

OTHER PUBLICATIONS

Thudor, F.; Autier, I.; Chupeau, B.; Lefebvre, F.; Oisel, L., "Automatic chaptering of VoD content based on DVD content," in Content-Based Multimedia Indexing (CBMI), 2012 10th International Workshop on , vol., No., pp. 1-6, Jun. 27-29, 2012.*

Ferran Diego, Daniel Ponsa, Joan Serrat, Antonio L'opez. Video alignment for differencespotting. Workshop on Multi-camera and Multi-modal Sensor Fusion Algorithms and Applications;—M2SFA2 2008, Oct. 2008, Marseille, France.*

* cited by examiner

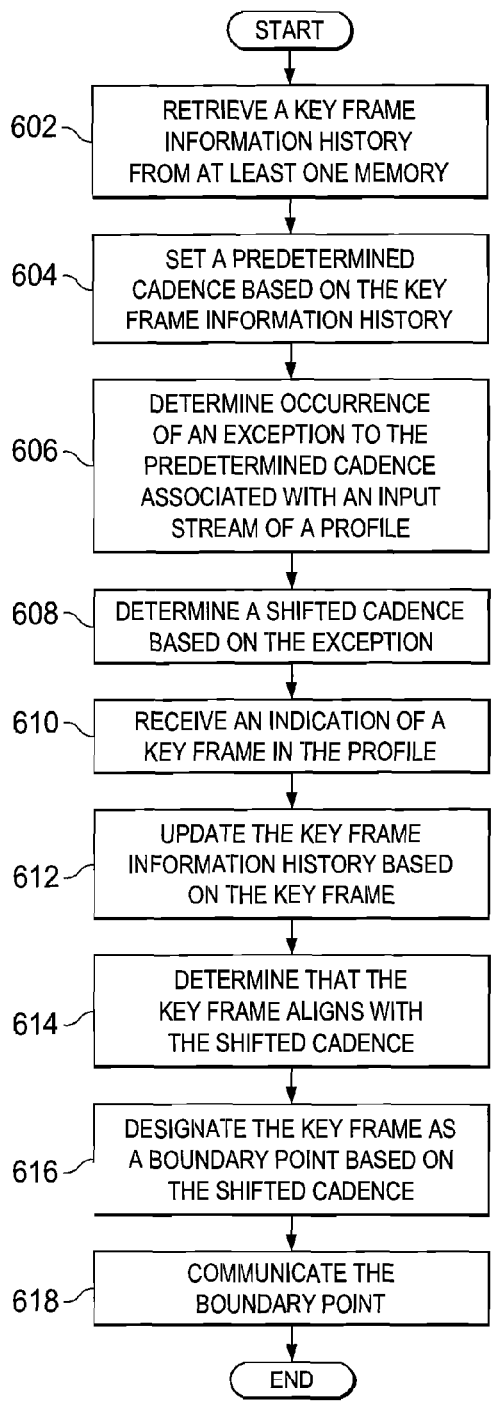
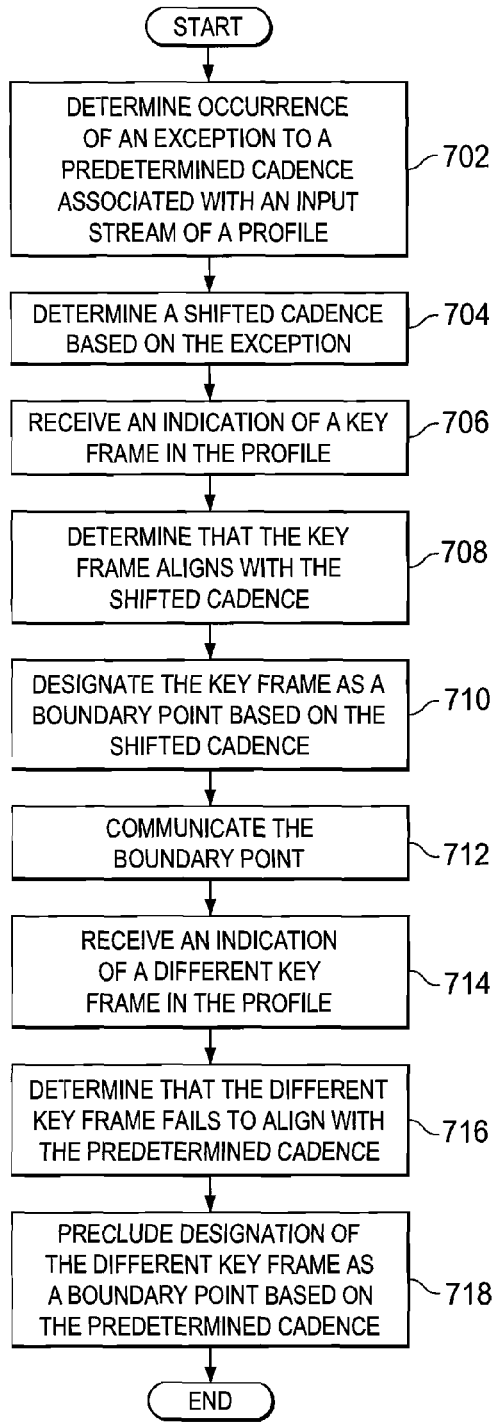
FIG. 6
FIG. 7

SYSTEM AND METHOD FOR LOCATING A BOUNDARY POINT WITHIN ADAPTIVE BITRATE CONDITIONED CONTENT

TECHNICAL FIELD

This disclosure relates in general to the field of communications and, more particularly, to locating a boundary point within adaptive bitrate conditioned content.

BACKGROUND

In the context of an adaptive bitrate client, it may be desirable to provide high fidelity video content to viewers despite uncertain and/or dynamic network conditions. Such an adaptive bitrate client may respond to constraints and/or variability in network conditions by requesting a different representation of the content, the different representation of the content encoded at a different bitrate and/or with different encoding parameters. In order to facilitate a seamless content viewing experience, it may be desirable to effectively synchronize and/or align the different representations of the content with one another by locating boundary points within the content.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified flowchart showing activities associated with locating a boundary point according to at least one example embodiment;

FIG. 7 is a simplified flowchart showing activities associated with locating a boundary point according to at least one example embodiment;

DETAILED DESCRIPTION OF EXAMPLE EMBODIMENTS

Overview

One or more embodiments may provide an apparatus, a computer readable medium, a non-transitory computer readable medium, a computer program product, and a method for determining an occurrence of an exception to a predetermined cadence associated with an input stream of a profile; determining a shifted cadence based, at least in part, on the exception; receiving an indication of a key frame in the profile; determining that the key frame aligns with the shifted cadence; designating the key frame as a boundary point based, at least in part, on the shifted cadence; and communicating the boundary point.

Example Embodiments

Figure 1A:
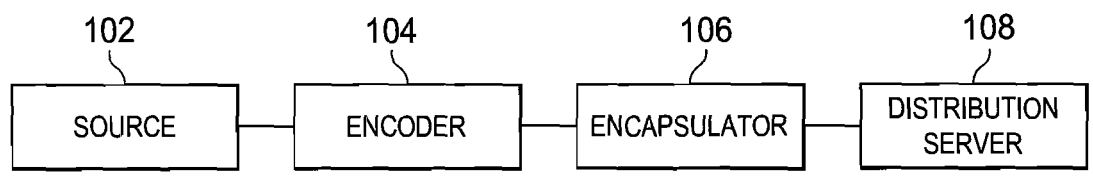
FIGS. 1A-1B are simplified block diagrams showing an apparatus according to at least one example embodiment.

FIG. 1A is a simplified block diagram showing a source 102, an encoder 104, an encapsulator 106, and a distribution server 108 according to at least one example embodiment. Each of these components may reflect a single apparatus, or these components may be consolidated in any suitable manner, which may be based on particular needs. The example of FIG. 1A is merely an example and does not limit the scope of the claims. For example, source 102, encoder 104, encapsulator 106, and/or distribution server 108 may vary, their respective communication channels may vary, the node arrangement (e.g., order, proximity, and/or the like) may similarly vary.

In some streaming environments, it may be desirable to stream video data from a source node and to a destination node. A source node may, for example, relate to a server, a streaming server, a publisher server, a distribution server, a content server, a video server, and/or the like. A destination node may, for example, relate to user equipment, an endpoint, a mobile node, a client device, a server, a streaming server, a publisher server, a distribution server, a content server, a video server, and/or the like. In general, streaming of video data may be a bandwidth intensive task. In order to facilitate the streaming of such data across a network, it may be desirable to utilize at least one of a variety of video compression methods such that the bandwidth associated with streaming of the video data is reduced.

In the example of FIG. 1A, source 102 may, for example, relate to a video data source node. The video data may be raw, uncompressed, and/or the like. For example, source 102 may communicate the video data to encoder 104 for subsequent encoding, transcoding, compression, communication, transmission, and/or the like. Encoder 104 may, for example, receive, encode, transcode, compress, communicate, and/or transmit the video data to encapsulator 106. For example, encoder 104 may receive uncompressed video data from source 102, compress the received video data in accordance to a predetermined compression protocol, and transmit the compressed video data to encapsulator 106. In another example, encoder 104 may receive un-encoded video data from source 102, encode the received video data in accordance to a predetermined encoding protocol, and transmit the encoded video data to encapsulator 106. The communicated video data may, for example, relate to synchronized and/or adaptive bitrate conditioned content. In at least one example embodiment, adaptive bitrate conditioned content relates to content in which corresponding content occurs in substantially all profiles, the points at which profiles are switched between occur at corresponding times in substantially all profiles, and/or boundary frames within the content begin with a key frame in substantially all profiles. In the example of FIG. 1A, encapsulator 106 receives video data from encoder 104. In the example of FIG. 1A, encapsulator 106 may, for example, receive the video data from encoder 104 and produce synchronized adaptive bitrate content in at least one adaptive bitrate formats. In at least one example embodiment, synchronized adaptive bitrate content relates to synchronization of profiles within an input stream such that corresponding content occurs at corresponding times across substantially all profiles associated with the input stream. In the example of FIG. 1A, encapsulator 106 communicates the synchronized video data to distribution server 108. Synchronized video data may, for example, relate to synchronized adaptive bitrate content. Distribution server 108 may, for example, relate to a streaming server, a web server, a database server, a file server, a distribution node, and/or the like.

Figure 1B:
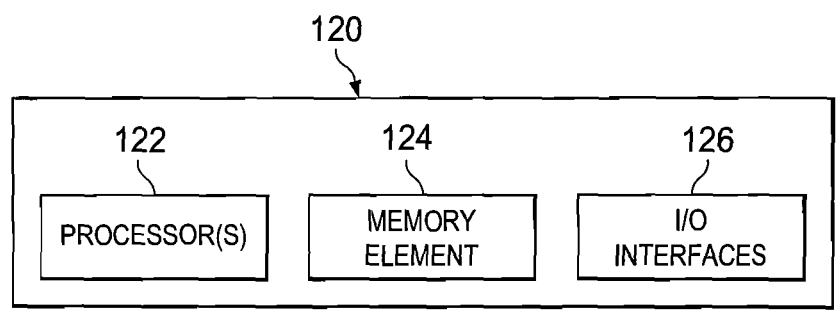

FIG. 1B is a simplified block diagram showing an electronic apparatus 120 according to at least one example embodiment. In one implementation, electronic apparatus 120 is a node associated with a network that includes software to achieve (or to foster) receipt of and/or transmission of data, such as video data, audio data, and/or the like, over the network, as described in this Specification. Electronic apparatus 120 may, for example, relate to source 102, encoder 104, encapsulator 106, and/or distribution server 108 of FIG. 1A. In at least one example embodiment, each of source 102, encoder 104, encapsulator 106, and/or distribution server 108 may have an internal structure (e.g., a processor, a memory element, etc.) to facilitate some of the operations described herein. In one or more example embodiments, the operations described herein may be performed wholly, partially, and/or in combination by source 102, encoder 104, encapsulator 106, and/or distribution server 108. Alternatively, electronic apparatus 120 may include software (or reciprocating software) that may coordinate with other network elements in order to achieve the operations, as outlined herein. In at least one example embodiment, one or several devices may include any suitable algorithms, hardware, software, components, modules, interfaces, or objects that facilitate the operations thereof.

In the example of FIG. 1B, electronic apparatus 120 includes processor(s) 122, memory element 124, and input/output (I/O) interface(s) 126. Processor(s) 122 is configured to execute various tasks of electronic apparatus 120 as described herein and memory element 124 is configured to store data associated with electronic apparatus 120. I/O interface(s) 126 is configured to receive communications from and/or send communications to other devices, user equipment, servers, network elements, nodes, software modules, and/or the like, such as one or more of the apparatuses of FIG. 1A.

Figure 2:
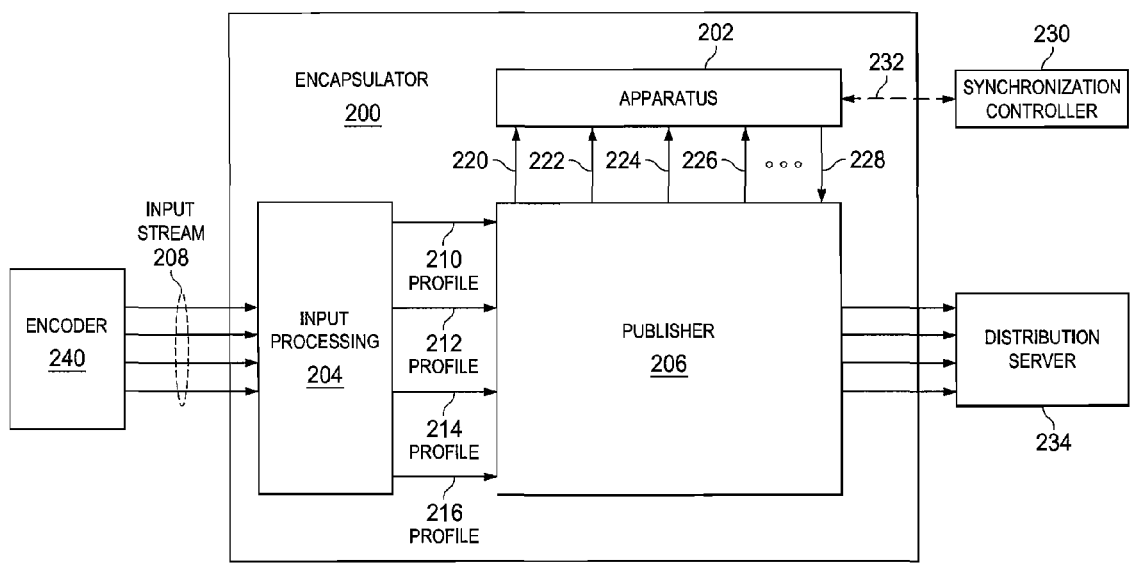
FIG. 2 is a simplified block diagram showing apparatus communication according to at least one example embodiment.

FIG. 2 is a simplified block diagram illustrating a communication system according to at least one example embodiment. The example of FIG. 2 is merely an example and does not limit the scope of the claims. For example, input stream count may vary, profile count may vary, communication channels may vary, communication paths may vary, and/or the like.

In typical streaming contexts, the propagation of video data is a bandwidth intensive task. To reduce bandwidth consumption/bandwidth requirements, in at least one example embodiment, a video compression method utilizing key frames is utilized. A key frame may, for example, relate to a video frame in which a complete image is stored in the video stream. In video compression, it may be desirable to stream key frames and changes that occur from one key frame to the next key frame. Streaming a limited number of full key frames may greatly reduce the amount of information transmitted in the video stream, thus reducing associated bandwidth requirements and/or utilization. A key frame video compression technique may operate on the assumption that most video content has only small changes in the image from one key frame to the next. Thus, for many segments of the video content, only the delta changes to the video content would have to be transmitted in the video stream. When a drastic change to the image occurs, such as when switching from one camera shot to another, at a scene change, and/or the like, a key frame may be created such that the entirety of the image is contained in the video stream. In some circumstances, it may be desirable for the entire image for the frame to be transmitted rather than only the delta changes, for example, when the visual difference between the two frames is so great that representing the new image incrementally from the previous frame would be more complex and/or would involve even more bits than reproducing the entire image. Key frames may be similar as described regarding FIG. 3.

In certain streaming contexts, it may be desirable to provide video content to viewers despite uncertain and/or dynamic network conditions. For example, in the case of a higher bandwidth network connection, it may be desirable to provide higher quality, lower compression video content. Similarly, in the case of a lower bandwidth network connection, it may be desirable to provide lower quality, higher compression video content. In such cases, it may be desirable to trade off video quality for video stream quality. Restated, a user may desire a smooth and continuous stream of lower quality video content over a rough and choppy stream of higher quality video content. Thus, for example, a user may desire to receive video content via a video stream that delivers optimized video content based, at least in part, on the user's network connection quality. In such an example, it may be desirable to utilize an adaptive bitrate client capable of responding to constraints and/or variability in network conditions by requesting a different representation of the content, the different representation of the content encoded at a different bitrate and/or with different encoding parameters. In at least one example embodiment, adaptive bitrate content is transmitted by way of an input stream. An input stream may, for example, relate to a video stream comprising a plurality of content representations. In one or more example embodiments, a content representation relates to a profile associated with an input stream. A profile may, for example, relate to video content that has been encoded at a specific bitrate. In one or more example embodiments, an input stream comprises a plurality of profiles. For example, the input stream may contain a plurality of profiles that have been encoded at various bitrates, resulting in a spectrum of quality and associated bitrates across the profiles of the input stream.

In certain streaming environments, network conditions may transition among various levels of quality. In such circumstances, it may be desirable to switch from a higher bitrate profile to a lower bitrate profile, to switch from a lower bitrate profile to a higher bitrate profile, and/or the like. For example, if network conditions degrade from optimal to suboptimal, it may be desirable to transition from a higher bitrate profile of an input stream to a lower bitrate profile of the input stream. In such an example, the lower bitrate profile may be associated with a lower bandwidth requirement such that the network is able to support streaming of the lower bitrate profile. In order to facilitate a desirable viewing experience, these different profiles may be synchronized and/or aligned with each other such that switching between the different profiles does not cause interruption, discontinuities, and/or the like, in streaming, video content playback, and/or the like. As such, it may be desirable for the different profiles of an input stream to comprise the same content such that switching from one profile of the input stream to another profile does not cause a shift in the relative playback and/or streaming location. In at least one example embodiment, profile switching occurs at certain predetermined points. For example, switching from one profile to another profile may occur at a point conducive to a smooth and/or seamless transition. In one or more example embodiments, the points at which profiles are switched between relate to boundary points. A boundary point may, for example, relate to a key frame that occurs at a corresponding time in substantially all profiles associated with an input stream. Boundary points may be similar as described regarding FIG. 3.

In the example of FIG. 2, encapsulator 200 relates to a node that produces synchronized adaptive bitrate encapsulated video content. Encapsulator 200 comprises apparatus 202, input processing 204, and publisher 206. In the example of FIG. 2, encapsulator 200 receives input stream 208 communicated from encoder 240 via input processing 204. In the example of FIG. 2, input stream 208 relates to an adaptive bitrate video stream. Input stream 208 comprises profile 210, 212, 214, and 216. Although the example of FIG. 2 illustrates four profiles associated with input stream 208, input stream 208 may be associated with fewer profiles or more profiles than illustrated. Each of profiles 210, 212, 214, and 216 relate to a different representation of the same video content. For example, each of profiles 210, 212, 214, and 216 may relate to different bitrate versions of the same video content. In the example of FIG. 2, profiles 210, 212, 214, and 216 are communicated from input processing 204 to publisher 206. Publisher 206 may, for example, relate to an adaptive bitrate publisher.

In one embodiment, publisher 206 communicates key frames 220, 222, 224, and 226 to apparatus 202. In the example of FIG. 2, key frames 220 relates to data indicative of key frames associated with profile 210, key frames 222 relates to data indicative of key frames associated with profile 212, key frames 224 relates to data indicative of key frames associated with profile 214, and key frames 226 relates to data indicative of key frames associated with profile 216. In the example of FIG. 2, apparatus 202 relates to a cadence detection node. Based, at least in part, on the received key frames 220, 222, 224, and 226, apparatus 202 determines boundary points associated with input stream 208 and communicates data indicative of boundary points 228 to publisher 206. Apparatus 202 and synchronization controller 230 are in communication via communication channel 232. In the example of FIG. 2, synchronization controller 230 relates to a synchronization controller, a synchronization node, and/or the like. The communication between apparatus 202 and synchronization controller 230 may, for example, relate to the communication of synchronization metadata, synchronization directives, and/or the like between apparatus 202 and synchronization controller 230. In the example of FIG. 2, publisher 206 is in communication with distribution server 234. Distribution server 234 may, for example, relate to an adaptive bitrate origin server. Publisher 206 communicates profiles 210, 212, 214, and 216 of input stream 208, together with data indicative of boundary points 228, to distribution server 234.

Figure 3:
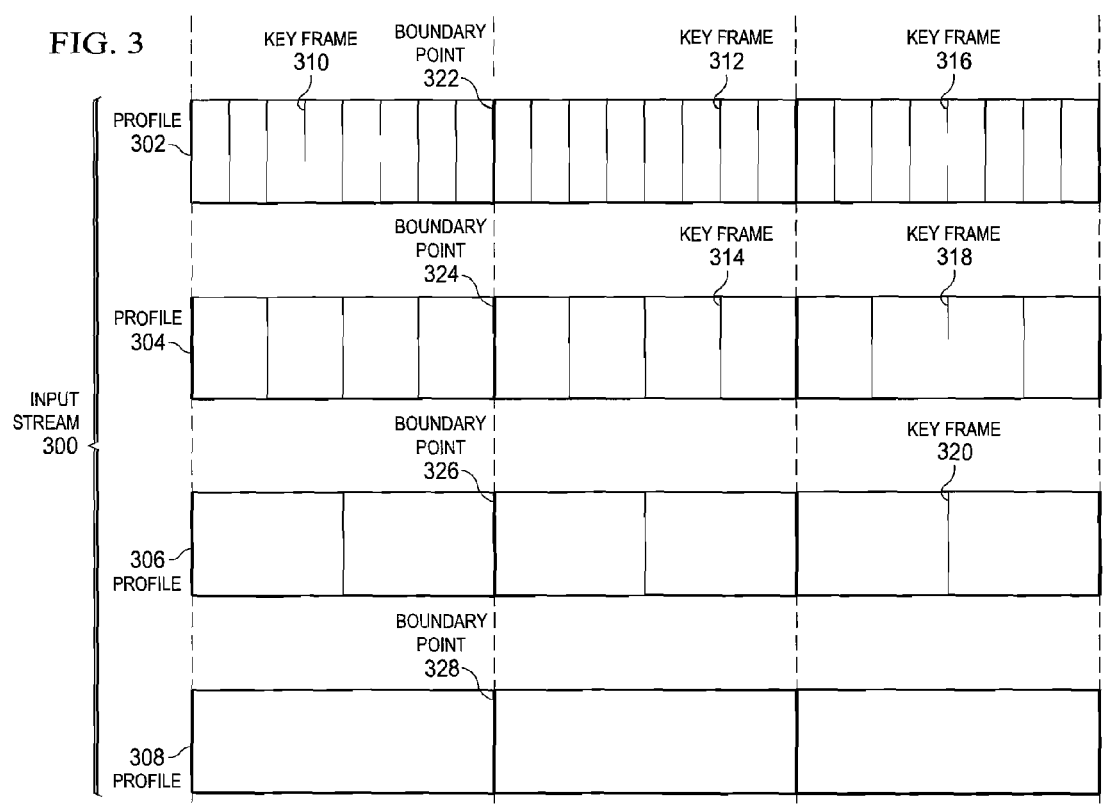
FIG. 3 is a simplified illustration showing key frames and boundary points according to at least one example embodiment.

FIG. 3 is a simplified illustration showing key frames and boundary points according to at least one example embodiment. In order to facilitate a seamless content viewing experience, it may be desirable to effectively synchronize and/or align different representations of content with one another by locating boundary points within the content. In certain streaming environments, it may be desirable to locate boundary points within synchronized, adaptive bitrate conditioned content. In at least one example embodiment, adaptive bitrate conditioned content relates to an input stream comprising a plurality of profiles in which the same content occurs synchronously in substantially all profiles. In at least one example embodiment, the points at which profiles are switched between, for example, the boundary points, occur synchronously in substantially all profiles. In one or more example embodiment, boundary points begin with a key frame on every profile.

In certain streaming environments, it may be desirable to locate a boundary point in a profile of an input stream based, at least in part, on explicit encoder boundary point markers. In at least one example embodiment, encoder boundary point markers relate to an explicit instruction to create a new adaptive bitrate segment at a particular point within the profile. In certain streaming environments, information indicative of an explicit encoder boundary point marker may be unavailable. In such circumstances, it may be desirable to observe key frame frequency and/or additional characteristics associated with a profile of an input stream in order to facilitate determination of boundary point location within the profile. In at least one example embodiment, a cadence of key frames is determined based, at least in part, on a set of heuristic rules, machine learning, and/or the like. The cadence, for example, relates to an interval at which a series of boundary points are spaced within the profile of the input stream. In one or more example embodiments, the interval at which a series of boundary points are spaced are equivalent across all profiles of the input stream. For example, in an adaptive bitrate input stream comprising a plurality of profiles, boundary points may be spaced synchronously within the plurality of profiles such that the boundary points align across the profiles of the input stream.

In at least one example embodiment, boundary points are identified based, at least in part, on locating patterns of key frames at specified time intervals. In one or more example embodiments, key frame information from a plurality of profiles may be used to identify boundary points that are aligned in time across the plurality of profiles. In effect, and without limiting the scope of this disclosure, the use of multiple profiles allows for boundary point information redundancy and may provide resilience against some types of loss associated with transmissions of the input stream. In one or more example embodiments, a boundary point may be used in determination of a position to cut a previous segment and begin a new segment. A segment may, for example, relate to a portion of a profile, a portion of multiple profiles, a portion of an input stream, and/or the like. In at least one example embodiment, a key frame associated with a profile of an input stream may be designated as a boundary point based, at least in part, on a cadence associated with the input stream. In at least one example embodiment, more than one cadence associated with a profile and/or an input stream may be identified. In such an example, each cadence may be associated with a different duration, segment length, and/or the like.

In certain streaming environments, it may be desirable to determine a cadence associated with an input stream based, at least in part, on historical data associated with key frame spacing within a profile of the input stream. In at least one example embodiment, key frame information is caused to be stored in a key frame information history. In such an example embodiment, in order to facilitate determination of a cadence, the key frame information history is retrieved from at least one memory and a predetermined cadence is set based, at least in part, on the key frame information history. In order to maintain an accurate key frame information history, as information indicative of a key frame is received from a profile, the key frame information history is caused to be updated based, at least in part, on the key frame.

In certain streaming environments, it may be desirable to set a cadence based, at least in part, on a cadence directive. For example, if a cadence associated with an input stream is known, predetermined, and/or the like, it may be desirable to set the cadence in accordance with the known and/or predetermined cadence. In at least one example embodiment, a cadence directive is received from a synchronization controller and the predetermined cadence is set based, at least in part, on the cadence directive.

The synchronization controller may, for example, relate to a controller that facilitates synchronization between two or more encapsulators. For example, the synchronization controller may ensure that an encapsulator and another encapsulator produce content based on the same cadence. The other encapsulator may, for example, relate to a redundant encapsulator. In at least one example embodiment, an association between an encapsulator and a redundant encapsulator is such that adaptive bitrate content produced by the encapsulator and the other encapsulator is identical such that an adaptive bitrate client may pull adaptive bitrate content from either the encapsulator or the redundant encapsulator without any quality impact, skipping, visual artifacts, and/or the like. The cadence directive may, for example, relate to an instruction, directive, and/or the like instructing the setting of a predetermined cadence associated with an input stream. In certain streaming environments, it may be desirable to send determined cadence information to the synchronization controller in order to facilitate the updating of such information. In at least one example embodiment, a predetermined cadence is caused to be communicated to a synchronization controller. For example, if a cadence associated with a synchronization controller fails to correlate with a cadence associated with an input stream, a different cadence may be determined and caused to be communicated to the synchronization controller in order to update the synchronization controller.

In at least one example embodiment, information indicative of a key frame is received. In at least one example embodiment, a key frame within a profile associated with an input stream is caused to be designated as a boundary point based, at least in part, on alignment with an associated cadence. Alternatively, for example, in one or more example embodiments, a key frame within a profile associated with an input stream is precluded from designation as a boundary point based, at least in part, on a determination that the key frame fails to align with the predetermined cadence.

In certain streaming environments, an exception to a predetermined cadence may occur. For example, a predetermined cadence may fail to align with boundary point spacing within the input stream due to packet loss, timestamp discontinuities, splicing events, advertisement insertions, and/or the like. In such an example, it may be desirable to deal with exceptions to a predetermined cadence without interruption and/or with minimal impact on boundary point identification. In at least one example embodiment, occurrence of an exception to a predetermined cadence associated with an input stream of a profile is determined. In one or more example embodiments, a shifted cadence is determined based, at least in part, on the exception to the predetermined cadence. In such an example, a received indication of a key frame in a profile of an input stream may fail to align with the predetermined cadence but may align with the shifted cadence. In such circumstances, the key frame may be designated as a boundary point based, at least in part, on the shifted cadence. In at least one example embodiment, after an exception to a predetermined cadence occurs, multiple possible boundary points within a profile are considered. For example, one possible boundary point may align with a pre-exception predetermined cadence. In such an example, the exception may not have shifted the cadence and the interval at which boundary points occur in the profile remains unchanged. Alternatively, another possible boundary point may align with a post-exception shifted cadence. In such an example, the exception may have shifted the cadence such that the interval at which boundary points occur in the profile after the exception aligns with the shifted cadence and not the predetermined cadence.

In at least one example embodiment, an exception relates to a small variation in a cadence of the profile. In such an example, the shifted cadence relates to a shortened cadence, a lengthened cadence, and/or the like. In at least one example embodiment, an exception relates to a packet loss associated with a profile. In such an embodiment, the shifted cadence may be based, at least in part, on another profile of the input stream. For example, as described previously, redundancy of key frame information is provided for by the plurality of profiles associated with the input stream. In certain streaming environments, key frame information, boundary point information, and/or the like may be lost from one profile during transmission of the profile data. In at least one example embodiment, a profile of an input stream associated with missing and/or lost key frame information may have its key frame information supplemented based, at least in part, on key frame information associated with another profile of the input stream.

In one or more example embodiments, an exception relates to a timestamp discontinuity. In such an example, the shifted cadence may be based, at least in part, on performance of a cadence detection process. A cadence detection process may, for example, relate to a determination of a cadence based, at least in part, on a key frame information history, a cadence directive received from a synchronization controller, and/or the like. In such an example, the shifted cadence may be based, at least in part, on inference of the shifted cadence based, at least in part, on a size of the timestamp discontinuity. For example, the predetermined cadence may be shifted some amount proportional to the size of the timestamp discontinuity. In at least one example embodiment, a timestamp discontinuity exception results in a shifted cadence based, at least in part, on a cadence directive. In at least one example embodiment, the cadence directive is received from a synchronization controller.

In at least one example embodiment, an exception relates to an advertisement insertion. In such an example, the shifted cadence may be based, at least in part, on auxiliary information associated with the profile. The auxiliary information associated with the profile may, for example, relate to in-band markers, out of band triggers, and/or the like. In one or more example embodiments, an exception relates to a splicing event. A splicing event may, for example, relate to a scene change, a video splice, and/or the like. In such an example embodiment, the shifted cadence may be based, at least in part, on auxiliary information associated with the profile.

In certain streaming environments, it may be desirable to selectively identify specific explicit boundary point markers that may follow a cadence within a profile associated with an input stream. An explicit boundary point marker may, for example, relate to explicit instructions from an encoder, transcoder, and/or the like to create a new boundary point at a particular point in a profile of an input stream. In at least one example embodiment, information indicating that a key frame relates to an explicit encoder boundary point is received. In such an example, a predetermined cadence may, for example, relate to a predetermined number of explicit encoder boundary points. A determination that a key frame aligns with the predetermined cadence may relate to a determination that the predetermined number of explicit encoder boundary points have been received since previous communication of a previous boundary point. In such an example embodiment, an exception may relate to receipt of an explicit encoder boundary point that fails to correspond with the predetermined cadence. The shifted cadence may be based, at least in part, on the explicit encoder boundary point. For example, boundary points associated with a profile may be identified based, at least in part, on a cadence associated with the profile. In certain example cases, an explicit boundary point marker may be received that fails to correspond with the predetermined boundary point cadence. In such an example, it may be desirable to determine a shifted cadence based, at least in part, on the received explicit boundary point marker.

In the example of FIG. 3, input stream 300 comprises profiles 302, 304, 306, and 308. Input stream 300 may, for example, relate to an adaptive bitrate video stream. In the example of FIG. 3, each of profiles 302, 304, 306, and 308 relate to an adaptive bitrate profile. In the example of FIG. 3, key frame 310 in profile 302 fails to align with a key frame in any of profiles 304, 306, or 308. As such, in the example of FIG. 3, key frame 310 is precluded from designation as a boundary point since key frame 310 fails to align with key frames in all other profiles associated with input stream 300. Key frame 312 in profile 302 aligns with key frame 314 in profile 304, but each of key frame 312 and 314 fails to align with a key frame in either profile 306 or 308. As such, in the example of FIG. 3, key frames 312 and 314 are precluded from designation as boundary points since key frames 312 and 314 fail to align with key frames in all other profiles associated with input stream 300. In the example of FIG. 3, key frame 316 in profile 302 aligns with key frame 318 in profile 304 and key frame 320 in profile 306, but each of key frame 316, 318, and 320 fails to align with a key frame in profile 308. As such, in the example of FIG. 3, key frames 316, 318, and 320 are precluded from designation as boundary points since key frames 316, 318, and 320 fail to align with key frames in all other profiles associated with input stream 300. In the example of FIG. 3, boundary points 322, 324, 326, and 328 relate to key frames that align with a cadence associated with input stream 300. Boundary points 322, 324, 326, and 328 may, for example, align across all profiles associated with input stream 300.

Figure 4:
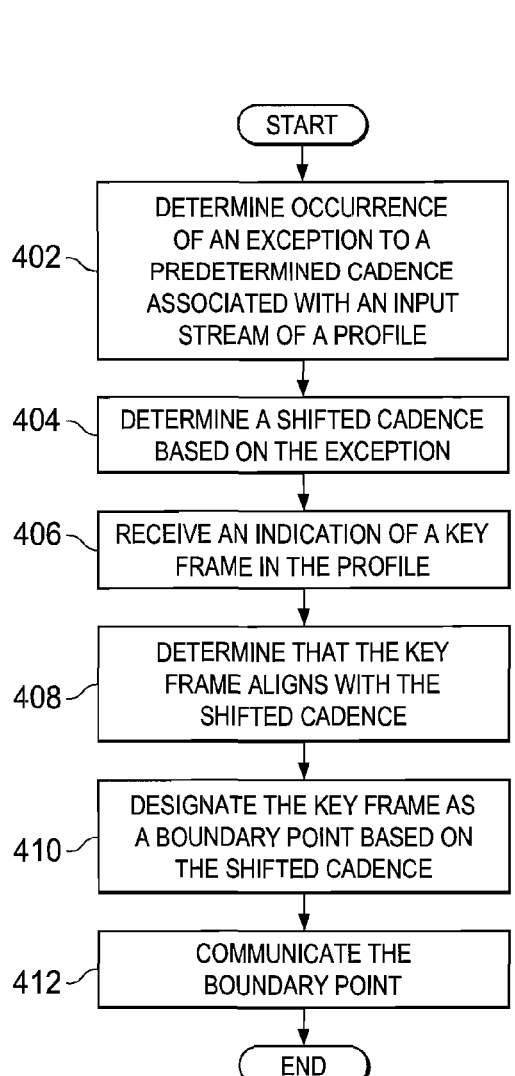
FIG. 4 is a simplified flowchart showing activities associated with locating a boundary point according to at least one example embodiment.

FIG. 4 is a simplified flowchart showing activities associated with locating a boundary point according to at least one example embodiment. In at least one example embodiment, there is a set of operations that corresponds with the activities of FIG. 4. An apparatus, for example electronic apparatus 120 of FIG. 1B, or a portion thereof, may utilize the set of operations. The electronic apparatus may comprise means, including, for example processor(s) 122 of FIG. 1B, for performance of such operations. In an example embodiment, an apparatus, for example, electronic apparatus 120 of FIG. 1B, is transformed by having memory, for example, memory element 124 of FIG. 1B, comprising computer code configured to, working with a processor, for example, processor(s) 122 of FIG. 1B, cause the apparatus to perform set of operations of FIG. 4.

In certain example cases, it may be desirable to determine a shifted cadence associated with an input stream of a profile based, at least in part, on occurrence of an exception to a predetermined cadence associated with the input stream of the profile. For example, the exception may cause a change in cadence such that the predetermined cadence fails to align with the changed cadence. In such an example, it may be desirable to determine a shifted cadence associated with the input stream of the profile. The shifted cadence may, for example, relate to a temporary shift in a cadence associated with the input stream of the profile. Thus, it may be desirable to maintain a value associated with the predetermined cadence.

At block 402, the apparatus determines occurrence of an exception to a predetermined cadence associated with an input stream of a profile. The occurrence, the exception, the predetermined cadence, the input stream, and the profile may be similar as described regarding FIG. 2 and FIG. 3. At block 404, the apparatus determines a shifted cadence based, at least in part, on the exception. The determination and the shifted cadence may be similar as described regarding FIG. 2 and FIG. 3. At block 406, the apparatus receives an indication of a key frame in the profile. The indication and the key frame may be similar as described regarding FIG. 2 and FIG. 3.

At block 408, the apparatus determines that the key frame aligns with the shifted cadence. The determination and the alignment of the key frame with the shifted cadence may be similar as described regarding FIG. 2 and FIG. 3. At block 410, the apparatus designates the key frame as a boundary point based, at least in part, on the shifted cadence. The boundary point and the designation of the key frame as the boundary point may be similar as described regarding FIG. 2 and FIG. 3. At block 412, the apparatus communicates the boundary point. The communication of the boundary point may be similar as described regarding FIG. 2 and FIG. 3.

Figure 5:
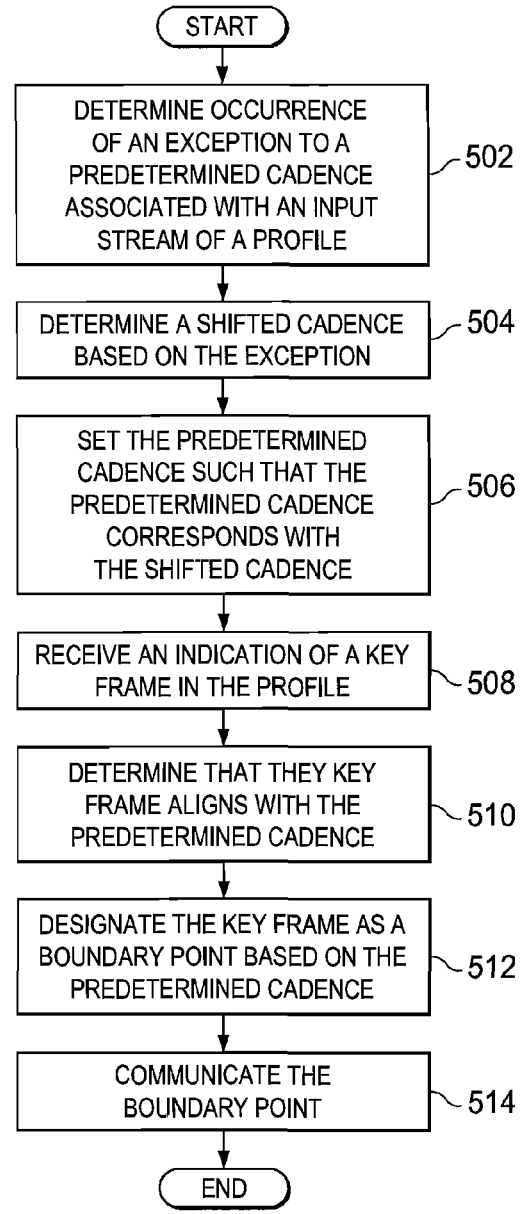
FIG. 5 is a simplified flowchart showing activities associated with locating a boundary point according to at least one example embodiment.

FIG. 5 is a simplified flowchart showing activities associated with locating a boundary point according to at least one example embodiment. In at least one example embodiment, there is a set of operations that corresponds with the activities of FIG. 5. An apparatus, for example electronic apparatus 120 of FIG. 1B, or a portion thereof, may utilize the set of operations. The electronic apparatus may comprise means, including, for example processor(s) 122 of FIG. 1B, for performance of such operations. In an example embodiment, an apparatus, for example, electronic apparatus 120 of FIG. 1B, is transformed by having memory, for example, memory element 124 of FIG. 1B, comprising computer code configured to, working with a processor, for example, processor(s) 122 of FIG. 1B, cause the apparatus to perform set of operations of FIG. 5.

In certain example cases, it may be desirable to determine a shifted cadence associated with an input stream of a profile based, at least in part, on occurrence of an exception to a predetermined cadence associated with the input stream of the profile. In such circumstances, it may be desirable to set the predetermined cadence such that the predetermined cadence corresponds with the shifted cadence. For example, the exception may cause a change in cadence such that the predetermined cadence fails to align with the changed cadence. In such an example, it may be desirable to determine a shifted cadence associated with the input stream of the profile. The shifted cadence may, for example, relate to an ongoing shift in a cadence associated with the input stream of the profile. Thus, it may be desirable to set a value associated with the predetermined cadence to align with the shifted cadence.

At block 502, the apparatus determines occurrence of an exception to a predetermined cadence associated with an input stream of a profile, similar as described regarding block 402 of FIG. 4. At block 504, the apparatus determines a shifted cadence based, at least in part, on the exception, similar as described regarding block 404 of FIG. 4. At block 506, the apparatus sets the predetermined cadence such that the predetermined cadence corresponds with the shifted cadence. The setting of the predetermined cadence and the correspondence with the shifted cadence may be similar as described regarding FIG. 2 and FIG. 3. At block 508, the apparatus receives an indication of a key frame in the profile, similar as described regarding block 406 of FIG. 4.

At block 510, the apparatus determines that the key frame aligns with the predetermined cadence. The determination and the alignment of the key frame with the predetermined cadence may be similar as described regarding FIG. 2 and FIG. 3. At block 512, the apparatus designates the key frame as a boundary point based, at least in part, on the predetermined cadence. The boundary point and the designation of the key frame as the boundary point may be similar as described regarding FIG. 2 and FIG. 3. At block 514, the apparatus communicates the boundary point, similar as described regarding block 412 of FIG. 4.

FIG. 6 is a simplified flowchart showing activities associated with locating a boundary point according to at least one example embodiment. In at least one example embodiment, there is a set of operations that corresponds with the activities of FIG. 6. An apparatus, for example electronic apparatus 120 of FIG. 1B, or a portion thereof, may utilize the set of operations. The electronic apparatus may comprise means, including, for example processor(s) 122 of FIG. 1B, for performance of such operations. In an example embodiment, an apparatus, for example, electronic apparatus 120 of FIG. 1B, is transformed by having memory, for example, memory element 124 of FIG. 1B, comprising computer code configured to, working with a processor, for example, processor(s) 122 of FIG. 1B, cause the apparatus to perform set of operations of FIG. 6.

In certain example cases, it may be desirable to aggregate a key frame information history associated with an input stream of a profile in order to facilitate determination of a predetermined cadence associated with the input stream of the profile. For example, it may be desirable to determined and/or set a predetermined cadence based, at least in part, on the key frame information history. The key frame information history may, for example, be utilized in determining a cadence associated with an input stream of a profile. Further, it may be desirable to update the key frame information history based, at least in part, on receipt of key frames associated with the input stream of the profile.

At block 602, the apparatus retrieves a key frame information history from at least one memory. The retrieval and the key frame information history may be similar as described regarding FIG. 2 and FIG. 3. At block 604, the apparatus sets a predetermined cadence based, at least in part, on the key frame information history. The setting and the predetermined cadence may be similar as described regarding FIG. 2 and FIG. 3.

At block 606, the apparatus determines occurrence of an exception to the predetermined cadence associated with an input stream of a profile, similar as described regarding block 402 of FIG. 4. At block 608, the apparatus determines a shifted cadence based, at least in part, on the exception, similar as described regarding block 404 of FIG. 4. At block 610, the apparatus receives an indication of a key frame in the profile, similar as described regarding block 406 of FIG. 4. At block 612, the apparatus updates the key frame information history based, at least in part, on the key frame. The update of the key information may be similar as described regarding FIG. 2 and FIG. 3. At block 614, the apparatus determines that the key frame aligns with the shifted cadence, similar as described regarding block 408 of FIG. 4. At block 616, the apparatus designates the key frame as a boundary point based, at least in part, on the shifted cadence, similar as described regarding block 410 of FIG. 4. At block 618, the apparatus communicates the boundary point, similar as described regarding block 412 of FIG. 4.

FIG. 7 is a simplified flowchart showing activities associated with locating a boundary point according to at least one example embodiment. In at least one example embodiment, there is a set of operations that corresponds with the activities of FIG. 7. An apparatus, for example electronic apparatus 120 of FIG. 1B, or a portion thereof, may utilize the set of operations. The electronic apparatus may comprise means, including, for example processor(s) 122 of FIG. 1B, for performance of such operations. In an example embodiment, an apparatus, for example, electronic apparatus 120 of FIG. 1B, is transformed by having memory, for example, memory element 124 of FIG. 1B, comprising computer code configured to, working with a processor, for example, processor(s) 122 of FIG. 1B, cause the apparatus to perform set of operations of FIG. 7.

In certain example cases, it may be desirable to determine that a key frame fails to align with a predetermined cadence. In such circumstances, it may be further desirable to preclude designation of the key frame as a boundary point. For example, a key frame aligning with a predetermined cadence may be designated as a boundary point based, at least in part, on alignment with the predetermined cadence, whereas a different key frame failing to align with the predetermined cadence may be precluded from designation as a boundary point based, at least in part, on failure to align with the predetermined cadence.

At block 702, the apparatus determines occurrence of an exception to a predetermined cadence associated with an input stream of a profile, similar as described regarding block 402 of FIG. 4. At block 704, the apparatus determines a shifted cadence based, at least in part, on the exception, similar as described regarding block 404 of FIG. 4. At block 706, the apparatus receives an indication of a key frame in the profile, similar as described regarding block 406 of FIG. 4. At block 708, the apparatus determines that the key frame aligns with the shifted cadence, similar as described regarding block 408 of FIG. 4. At block 710, the apparatus designates the key frame as a boundary point based, at least in part, on the shifted cadence, similar as described regarding block 410 of FIG. 4. At block 712, the apparatus communicates the boundary point, similar as described regarding block 412 of FIG. 4.

At block 714, the apparatus receives an indication of a different key frame in the profile. The receipt, the indication, and the different key frame may be similar as described regarding FIG. 2 and FIG. 3. At block 716, the apparatus determines that the different key frame fails to align with the shifted cadence. The determination and the failure of the different key frame to align with the shifted cadence may be similar as described regarding FIG. 2 and FIG. 3. At block 718, the apparatus precludes designation of the different key frame as a boundary point based, at least in part, on the shifted cadence. The preclusion of designation and the boundary point may be similar as described regarding FIG. 2 and FIG. 3.

Figure 8:
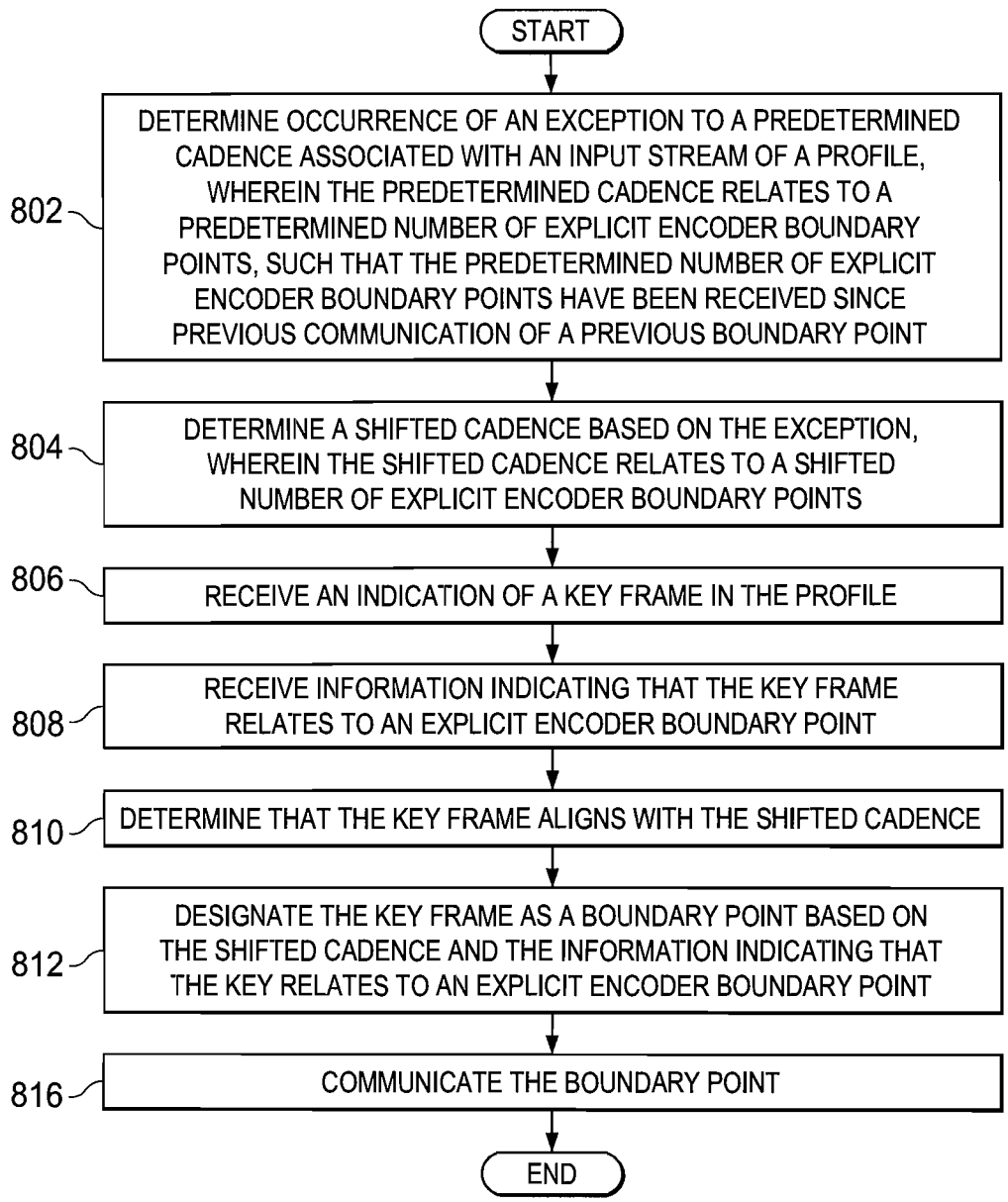
FIG. 8 is a simplified flowchart showing activities associated with locating a boundary point according to at least one example embodiment.

FIG. 8 is a simplified flowchart showing activities associated with locating a boundary point according to at least one example embodiment. In at least one example embodiment, there is a set of operations that corresponds with the activities of FIG. 8. An apparatus, for example electronic apparatus 120 of FIG. 1B, or a portion thereof, may utilize the set of operations. The electronic apparatus may comprise means, including, for example processor(s) 122 of FIG. 1B, for performance of such operations. In an example embodiment, an apparatus, for example, electronic apparatus 120 of FIG. 1B, is transformed by having memory, for example, memory element 124 of FIG. 1B, comprising computer code configured to, working with a processor, for example, processor(s) 122 of FIG. 1B, cause the apparatus to perform set of operations of FIG. 8.

In certain example embodiments, an apparatus may receive indication of explicit encoder boundary points associated with an input stream of a profile. In such circumstances, it may be desirable to designate only a subset of the received explicit encoder boundary points as boundary points. For example, it may be desirable to find a cadence associated with the received explicit encoder boundary points.

At block 802, the apparatus determines occurrence of an exception to a predetermined cadence associated with an input stream of a profile, wherein the predetermined cadence relates to a predetermined number of explicit encoder boundary points, such that the predetermined number of explicit encoder boundary points have been received since previous communication of a previous boundary point. The exception, the predetermined cadence, the input stream, the profile, the predetermined number of explicit encoder boundary points, the previous communication, and the previous boundary point may be similar as described regarding FIG. 2 and FIG. 3.

At block 804, the apparatus determines a shifted cadence based, at least in part, on the exception, wherein the shifted cadence relates to a shifted number of explicit encoder boundary points. The determination, the shifted cadence, and the shifted number of explicit encoder boundary points may be similar as described regarding FIG. 2 and FIG. 3.

At block 806, the apparatus receives an indication of a key frame in the profile, similar as described regarding block 406 of FIG. 4. At block 808, the apparatus receives information indicating that the key frame relates to an explicit encoder boundary point. The receipt, the information, and the explicit encoder boundary point may be similar as described regarding FIG. 2 and FIG. 3. At block 810, the apparatus determines that the key frame aligns with the shifted cadence, similar as described regarding block 408 of FIG. 4.

At block 812, the apparatus designates the key frame as a boundary point based, at least in part, on the shifted cadence and the information indicating that the key relates to an explicit encoder boundary point. The boundary point and the designation of the key frame as the boundary point may be similar as described regarding FIG. 2 and FIG. 3. At block 814, the apparatus communicates the boundary point, similar as described regarding block 412 of FIG. 4.

Figure 9:
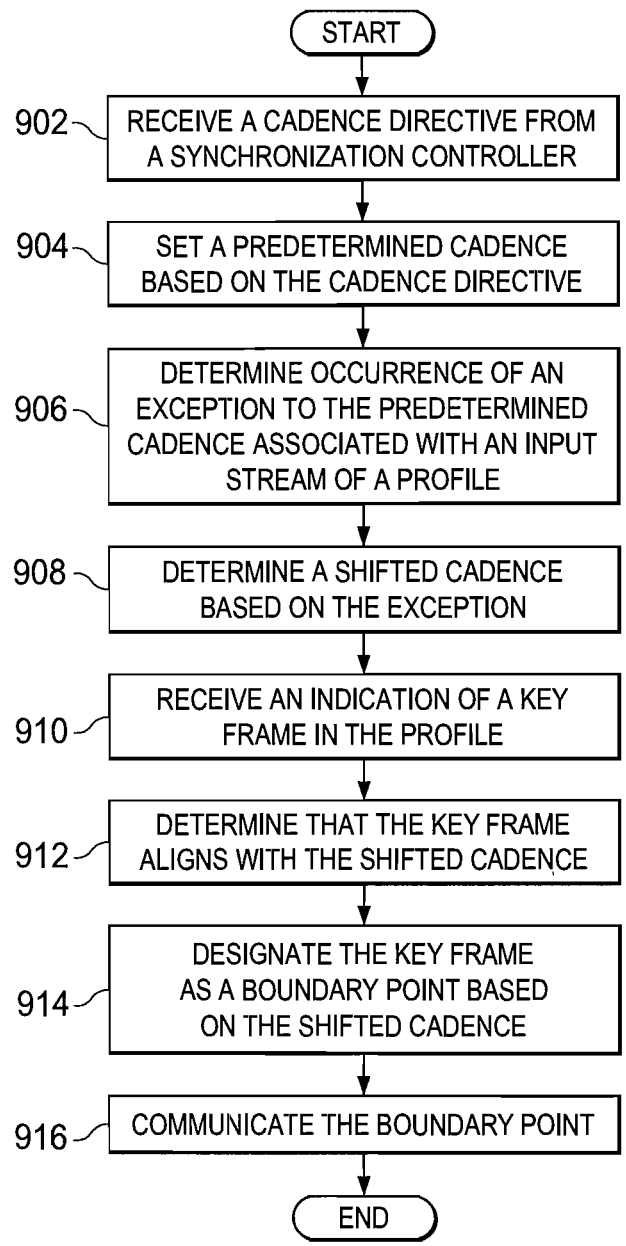
FIG. 9 is a simplified flowchart showing activities associated with locating a boundary point according to at least one example embodiment.

FIG. 9 is a simplified flowchart showing activities associated with locating a boundary point according to at least one example embodiment. In at least one example embodiment, there is a set of operations that corresponds with the activities of FIG. 9. An apparatus, for example electronic apparatus 120 of FIG. 1B, or a portion thereof, may utilize the set of operations. The electronic apparatus may comprise means, including, for example processor(s) 122 of FIG. 1B, for performance of such operations. In an example embodiment, an apparatus, for example, electronic apparatus 120 of FIG. 1B, is transformed by having memory, for example, memory element 124 of FIG. 1B, comprising computer code configured to, working with a processor, for example, processor(s) 122 of FIG. 1B, cause the apparatus to perform set of operations of FIG. 9.

In certain example embodiments, it may be desirable to set a predetermined cadence based, at least in part, on a cadence directive received from a synchronization controller. Such a cadence directive may, for example, be associated with synchronization with a redundant encapsulator, setting the predetermined cadence based on a known cadence associated with an input stream of a profile, and/or the like.

At block 902, the apparatus receives a cadence directive from a synchronization controller. The receipt, the cadence directive, and the synchronization controller may be similar as described regarding FIG. 2 and FIG. 3. At block 904, the apparatus sets a predetermined cadence based on the cadence directive. The setting and the predetermined cadence may be similar as described regarding FIG. 2 and FIG. 3. At block 906, the apparatus determines occurrence of an exception to the predetermined cadence associated with an input stream of a profile, similar as described regarding block 402 of FIG. 4. At block 908, the apparatus determines a shifted cadence based, at least in part, on the exception, similar as described regarding block 404 of FIG. 4.

At block 910, the apparatus receives an indication of a key frame in the profile, similar as described regarding block 406 of FIG. 4. At block 912, the apparatus determines that the key frame aligns with the shifted cadence, similar as described regarding block 408 of FIG. 4. At block 914, the apparatus designates the key frame as a boundary point based, at least in part, on the shifted cadence, similar as described regarding block 410 of FIG. 4. At block 916, the apparatus communicates the boundary point, similar as described regarding block 412 of FIG. 4.

As used herein, the sources, encoders, encapsulators, and distribution servers may related to nodes that can facilitate the communicating, receiving, transmission, encoding, encapsulation, synchronizing, distribution, aligning, processing, and/or similar activities discussed herein. As used herein in this Specification, the term 'node' is meant to encompass routers, switches, cable boxes, gateways, bridges, load balancers, access concentrators, firewalls, inline service nodes, proxies, servers, processors, modules, or any other suitable device, component, element, proprietary appliance, or object operable to process and/or exchange information in a network environment. These nodes may include any suitable hardware, software, components, modules, interfaces, or objects that facilitate the operations thereof. This may be inclusive of appropriate algorithms, communication protocols, and interfaces that allow for the effective exchange of data or information.

In one implementation, one or more of the nodes include software to achieve (or to foster) the activities discussed herein. This could include, for example, the implementation of instances of software modules (where these modules interact, perform reciprocating functions, and/or suitably coordinate their activities with peers). Additionally, each of these elements can have an internal structure (e.g., a processor, a memory element, etc.) to facilitate some of the operations described herein. In other embodiments, these activities may be executed externally to these elements, or included in some other network element to achieve the intended functionality. Alternatively, one or more of the nodes may include software (or reciprocating software) that can coordinate with other network elements in order to achieve the activities described herein. In still other embodiments, one or several devices may include any suitable algorithms, hardware, software, components, modules, interfaces, or objects that facilitate the operations thereof.

Note that in certain example implementations, the functions outlined herein associated with network interactions may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory [as shown in FIG. 1] can store data used for the operations described herein. This includes the memory being able to store instructions (e.g., software, logic, processor instructions, etc.) that can be executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Furthermore, various memory items (e.g., databases, tables, queues, buffers, caches, trees, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that the present disclosure (and its teachings) are readily scalable and can accommodate a large number of components, as well as more complicated/sophisticated arrangements and configurations. Accordingly, the examples provided should not limit the scope or inhibit the broad teachings of the present disclosure as potentially applied to a myriad of other architectures.

It is important to note that the steps in the preceding flow diagrams illustrate only some of the possible signaling scenarios and patterns that may be executed by, or within, any of the components of FIG. 1A (e.g., source 102, encoder 104, encapsulator 106, and/or distribution server 108). Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. If desired, the different functions discussed herein may be performed in a different order and/or concurrently with each other. For example, block 614 FIG. 6 may be performed before block 612 of FIG. 6. Furthermore, if desired, one or more of the above-described functions may be optional or may be combined. For example, block 808 of FIG. 8 may be option or may be combined with block 806 of FIG. 8. The preceding operational flows have been offered for purposes of example and discussion. Substantial flexibility is provided by the framework of FIG. 1A in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although source 102, encoder 104, encapsulator 106, and/or distribution server 108 has been illustrated with reference to particular elements and operations that facilitate the communication process, these elements and operations may be replaced by any suitable architecture or process that achieves the intended functionality.

It is also noted herein that while the above describes example embodiments, these descriptions should not be viewed in a limiting sense. Rather, there are variations and modifications which may be made without departing from the scope of the present specification as defined in the appended claims. Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   at least one processor;
   at least one memory including computer program code, the memory and the computer program code configured to, working with the processor, cause the apparatus to perform at least the following:
      determine an occurrence of an exception to a predetermined cadence associated with an input stream of a profile;
      determine a shifted cadence based, at least in part, on the exception;
      receive an indication of a key frame in the profile;
      determine that the key frame aligns with the shifted cadence;
      designate the key frame as a boundary point based, at least in part, on the shifted cadence;
      communicate the boundary point;
      receive an indication of a different key frame in the profile;
      determine that the different key frame fails to align with the predetermined cadence; and
      preclude a designation of the different key frame as a boundary points based, at least in part, on the predetermined cadence.

2. The apparatus of claim 1, wherein the cadence relates to an interval at which a series of boundary points are spaced within the profile of the input stream.

3. The apparatus of claim 2, wherein the interval at which a series of boundary points are spaced are substantially equivalent across substantially all profiles of the input stream.

4. The apparatus of claim 1, wherein the memory further includes computer program instructions that, when executed by the at least one processor, cause the apparatus to perform setting of the predetermined cadence such that the predetermined cadence corresponds with the shifted cadence.

5. The apparatus of claim 1, wherein the memory further includes computer program instructions that, when executed by the at least one processor, cause the apparatus to perform:

retrieval of a key frame information history from at least one memory; and setting of the predetermined cadence based, at least in part, on the key frame information history.

6. The apparatus of claim 5, wherein the memory further includes computer program instructions that, when executed by the at least one processor, cause the apparatus to perform updating of the key frame information history based, at least in part, on the key frame.

7. The apparatus of claim 1, wherein the memory further includes computer program instructions that, when executed by the at least one processor, cause the apparatus to perform receipt of information indicating that the key frame relates to an explicit encoder boundary point wherein the predetermined cadence relates to a predetermined number of explicit encoder boundary points, and the determination that the key frame aligns with the predetermined cadence relates to a determination that the predetermined number of explicit encoder boundary points have been received since previous communication of a previous boundary point.

8. The apparatus of claim 1, wherein the memory further includes computer program instructions that, when executed by the at least one processor, cause the apparatus to perform:

receipt of a cadence directive from a synchronization controller; and setting of the predetermined cadence based, at least in part, on the cadence directive.

9. A method, comprising:

determining an occurrence of an exception to a predetermined cadence associated with an input stream of a profile;

determining a shifted cadence based, at least in part, on the exception;

receiving an indication of a key frame in the profile;

determining that the key frame aligns with the shifted cadence;

designating the key frame as a boundary point based, at least in part, on the shifted cadence;

communicating the boundary point;

receiving an indication of a different key frame in the profile;

determining that the different key frame fails to align with the predetermined cadence; and precluding a designation of the different key frame as a boundary points based, at least in part, on the predetermined cadence.

10. The method of claim 9, further comprising setting the predetermined cadence such that the predetermined cadence corresponds with the shifted cadence.

11. The method of claim 9, further comprising:

retrieving a key frame information history from at least one memory; and setting the predetermined cadence based, at least in part, on the key frame information history.

12. The method of claim 11, further comprising updating the key frame information history based, at least in part, on the key frame.

13. The method of claim 9, further comprising receiving information indicating that the key frame relates to an explicit encoder boundary point wherein the predetermined cadence relates to a predetermined number of explicit encoder boundary points, and the determination that the key frame aligns with the predetermined cadence relates to a determination that the predetermined number of explicit encoder boundary points have been received since previous communication of a previous boundary point.

14. The method of claim 9, further comprising:

receiving a cadence directive from a synchronization controller; and setting the predetermined cadence based, at least in part, on the cadence directive.

15. At least one non-transitory computer-readable medium encoded with instructions that, when executed by a processor, cause the processor to:

determine an occurrence of an exception to a predetermined cadence associated with an input stream of a profile;

determine a shifted cadence based, at least in part, on the exception;

receive an indication of a key frame in the profile;

determine that the key frame aligns with the shifted cadence;

designate the key frame as a boundary point based, at least in part, on the shifted cadence;

communicate the boundary point;

receive an indication of a different key frame in the profile;

determine that the different key frame fails to align with the predetermined cadence; and preclude a designation of the different key frame as a boundary points based, at least in part, on the predetermined cadence.

16. The medium of claim 15, encoded with instructions that, when executed by a processor, perform:

retrieving a key frame information history from at least one memory; and setting the predetermined cadence based, at least in part, on the key frame information history.

17. The medium of claim 15, encoded with instructions that, when executed by a processor, perform:

receiving a cadence directive from a synchronization controller; and setting the predetermined cadence based, at least in part, on the cadence directive.

* * * * *